Feb. 20, 1940.                    S. O. WHITE                    2,190,964
                            TRANSMISSION SYNCHRONIZER
                              Filed May 16, 1938              2 Sheets-Sheet 2
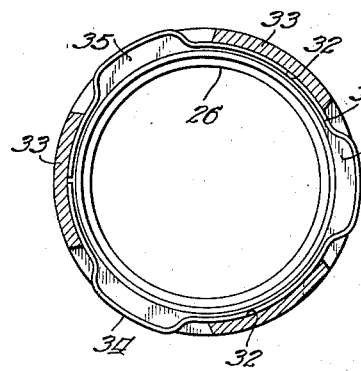
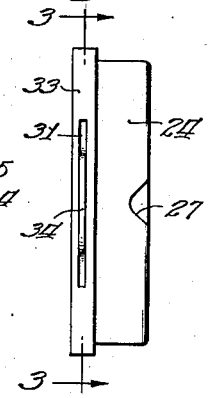
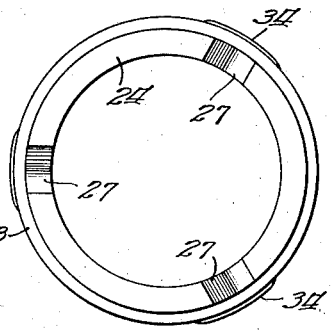
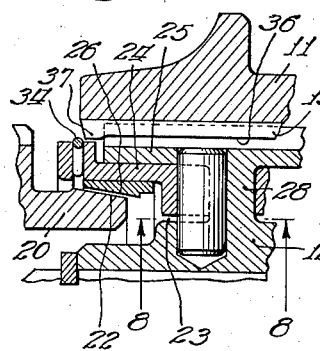
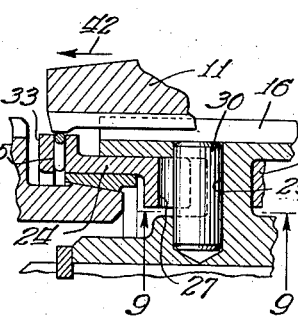
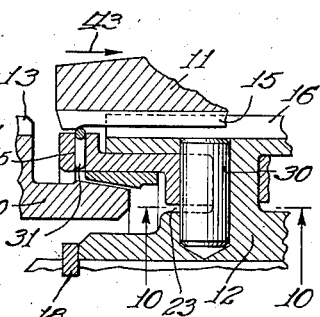
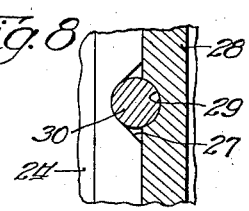
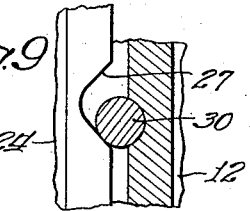
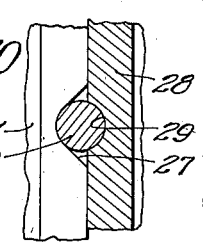
Inventor:
Samuel O. White
By: Edward C. Gritzbaugh
                Atty.

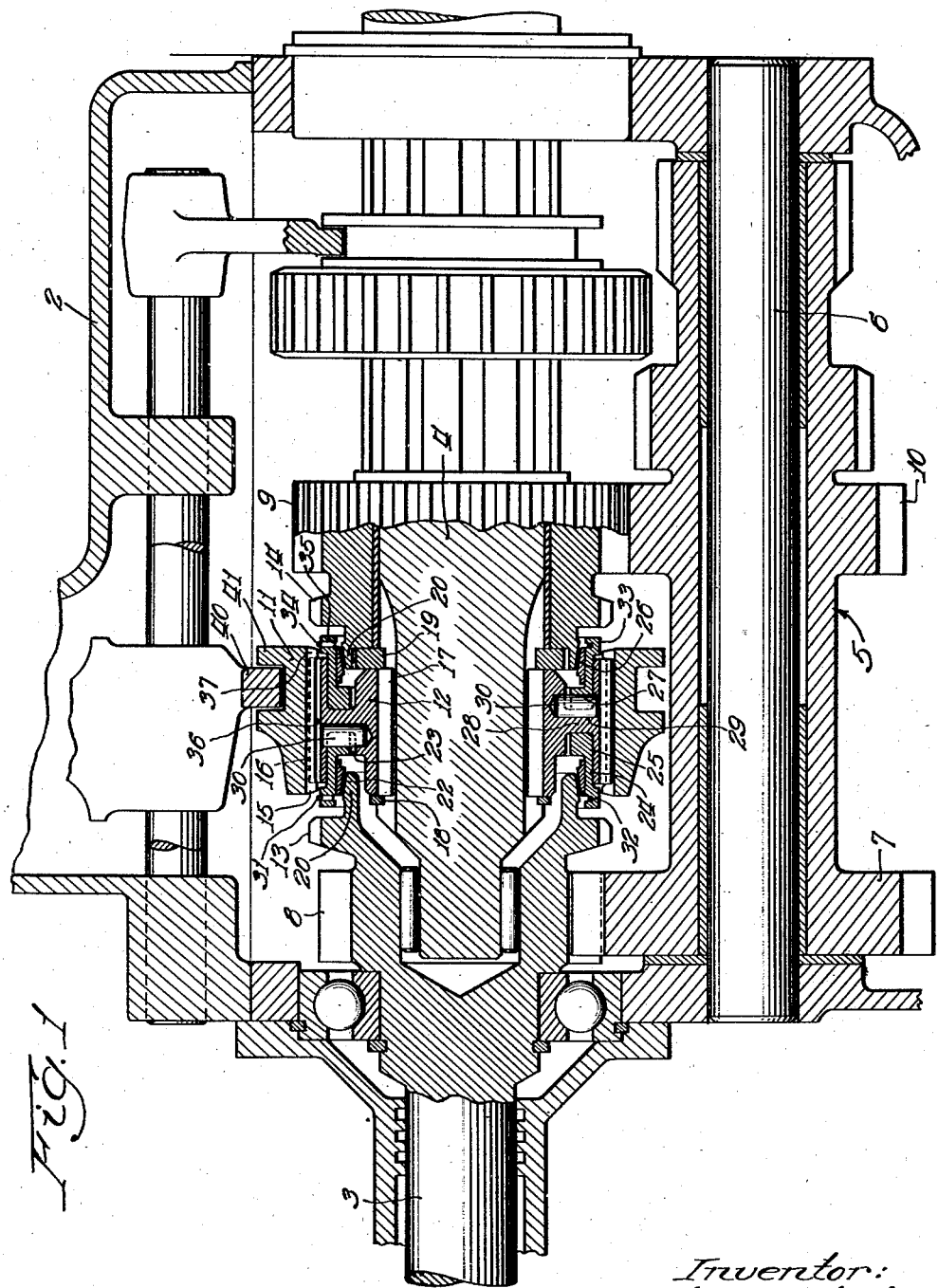

Patented Feb. 20, 1940

2,190,964

UNITED STATES PATENT OFFICE 2,190,964

TRANSMISSION SYNCHRONIZER

Samuel O. White, Muncie, Ind., assignor to Borg-Warner Corporation, Chicago, Ill., a corporation of Illinois Application May 16, 1938, Serial No. 208,107

11 Claims. (Cl. 192—53)

This invention relates to improvements in synchro-mesh transmissions and more particularly to synchro-mesh transmission mechanism wherein the friction clutch of the synchronizer is energized by the torque differential between the driving and driven shafts of the transmission.

An object of my invention is to provide an improved synchro-mesh transmission of the self-energizing type wherein the cooperating friction clutch elements of the synchronizer are caused to engage with one another under forces proportional to the difference in speed between the driving shaft and the driven shaft of the transmission, and wherein the self-energizing instrumentality may occupy a space no greater than that allotted to the conventional type of transmission gear synchronizer.

Another object is to provide an improved synchronizer mechanism for transmissions wherein the friction clutch elements thereof are automatically released when the speed of the driving shaft and the driven shaft is the same.

Another object is to provide an improved synchronizer mechanism for transmissions in which all of the elements thereof are so arranged relative to one another and to the driving and driven shafts so as not to impair smooth and efficient operation of the mechanism when under the influence of centrifugal force as during revolution of the parts.

A further object is to provide an improved synchronizer mechanism for transmissions which is extremely simple in construction; which will not readily exhibit wear through extensive use, and which may be manufactured at a relatively low cost.

Another object is to provide an improved synchronizer mechanism for transmissions in which minimum resistance is offered to the movement of the movable clutch member.

Other objects, the advantages and uses of the invention will become apparent after reading the following specification and claims, and after consideration of the drawings forming a part of the specification, wherein:

Fig. 1 is an axial sectional view through a transmission embodying the invention;

Fig. 2 is a side elevation of one of the synchronizer rings;

Fig. 3 is a transverse sectional view therethrough;

Fig. 4 is an end elevation of the same;

Fig. 5 is an enlarged detail sectional view through a portion of the synchronizer mechanism with the parts shown in the positions they assume prior to commencement of shifting movement toward engaging position;

Fig. 6 is a similar view with the parts in one position of movement toward engaging position;

Fig. 7 is a similar view with the parts moving toward disengaged position;

Fig. 8 is a detail sectional view taken on the line 8—8 of Fig. 5;

Fig. 9 is a detail sectional view taken on the line 9—9 of Fig. 6;

Fig. 10 is a detail sectional view taken on the line 10—10 of Fig. 7; and

Fig. 11 is a view similar to Fig. 5, showing a somewhat modified form of the invention.

I have selected, for the purpose of illustrating one form in which the invention may be embodied, a motor vehicle transmission of a well known type which may comprise, as illustrated in Fig. 1, a casing 2, a drive shaft 3, driven by the engine of a vehicle through any suitable manual clutch arangement, a driven shaft 4 in axial alignment with the shaft 3, and a group of rigidly interconnected spur gears 5 rotatably mounted upon a fixed shaft 6 and comprising the countershaft gears of the transmission.

The countershaft assembly 5 includes a gear 7 in constant mesh with a drive pinion 8 on the driving shaft 3. A gear 9, rotatably mounted on the driven shaft 4, may be constantly driven by a gear 10 of the countershaft assembly 5. The driven shaft 4 may be selectively connected either in direct one-to-one ratio with the drive shaft 3, or in a lower gear ratio, by means of a shiftable clutch 11, having a splined connection with the driven shaft 4 through the medium of a torque-transmitting member 12 and adapted to be shifted axially in either direction from the neutral position shown in Fig. 1, so as to make positive clutching engagement either with clutch teeth 13 on the drive shaft 3 or clutch teeth 14 on the gear 9. Such positive clutching engagement is effected by the meshing of internal splined teeth 15 of the shiftable clutch element 11 with the teeth 13 or 14, as the case may be.

The teeth 15 are in constant mesh with splines 16 on the torque-transmitting member 12 so as to form an axially slidable, but non-rotatable, connection between the shiftable clutch element 11 and the torque-transmitting member 12. The torque-transmitting member 12 in turn is splined, as at 17, upon the driven shaft 4, and fixed against axial movement by retaining rings 18 and 19 respectively secured in annular recesses in the shaft 4. Except for difficulties in production, the torque-transmitting member 12 might be made integral with the shaft 4. The member 12 makes it possible to form the shiftable clutch member 11 in the form of a relatively light annular ring having low inertia resistance to shifting movement. It also serves as a bearing member for mounting the synchronizer rings which will shortly be described, and as a reaction member for the self-energizing, or servo mechanism for exerting axial pressure against such synchronizer ring.

Formed integrally with the positive clutch elements 13 and 14, respectively, are a pair of friction clutch elements 20 each having an external conical friction face 22 (see Figs. 5 to 7 inclusive). Mounted in annular recesses 23 extending axially into the torque-transmitting member 12 from both ends thereof, are a pair of synchronizer rings 24. Each of the rings 24 has an external cylindrical face bearing against an internal cylindrical face of the rim portion 25 of the torque-transmitting member 12, so as to allow the synchronizer ring to oscillate and to move axially relative to the torque-transmitting member 12. Each synchronizer ring 24 has an internal conical friction face 26 adapted for engagement with the friction face 22 of the corresponding clutch element 20. Engagement of the friction faces 22 and 26 serves to reduce the differential of speed of rotation of the shiftable clutch element 11 and a clutch member 13 or 14, so as to attain synchronization of the shiftable clutch element and the co-acting clutch member, and to allow them to become engaged with one another.

Each of the synchronizer rings is provided with a plurality of substantially V-shaped notches 27 in one end, facing axially toward the web portion 28 of the torque-transmitting member 12. The web portion 28 may have a corresponding series of partially cylindrical bearing recesses 29, and between these recesses 29 and the notches 27 are disposed a series of rollers 30 positioned with their longitudinal axes extending radially with respect to the axis of the torque-transmitting member 12. Oscillation of the synchronizer ring 24 with respect to the torque-transmitting member 12 will cause the inclined faces of the notches 30 to ride upon the rollers 29 which will be retained in position with respect to the torque-transmitting member 12 by the notches 29, whereby the synchronizer rings will be projected axially away from the torque-transmitting member 12 toward their respective co-acting clutch elements 21 or 20, as the case may be. The angle of the faces of the notches 27 is such as to avoid too rapid locking of the facings in their engagement with each other, i. e., so as to allow the facings to slip for a sufficient interval to only allow synchronization to be effected without undue strain on the parts.

Oscillating movement of the synchronizer ring 24 with respect to the torque-transmitting member 12 will be induced whenever the clutch face 26 of a synchronizer ring 24 engages the corresponding clutch face 22 of a clutch member 20. Thus, once the engagement between the two friction facings has been initiated, there will be a self-energizing increase in such engagement, so that all that is required on the part of the operator is to move the synchronizer ring into initial engagement with the cooperating clutch member, and synchronization will thereupon be effected without further manual pressure. Mechanism for accomplishing a self-energizing function of this type in, for example, braking devices, is commonly known as a "servo" mechanism, and will be hereinafter referred to as such.

The arrangement according to the present invention has the advantage that the synchronizer rings 24 may be of minimum bulk. This is important in view of the fact that the preferable material to employ in these rings is bronze, which is expensive. If desired, the rings 24 may be made of steel, and the friction facings 26 formed as thin bronze rings, as indicated in Figs. 5, 6 and 7. Being supported within the cylindrical wall of the shell 24, a friction facing 26 thus formed, is fully protected against the action of centrifugal force and will accurately retain its shape at any speed.

Another advantage of the present invention resides in the fact that the arrangement is such that when the speed of the two members to be synchronized becomes the same, the servo action will cease and the synchronizer ring will become disengaged from the co-acting clutch member. This is due to the fact that the means for initiating clutching engagement, which will shortly be described, has become operative only during the interval necessary for such initiation, and has subsequently left the synchronizer ring free to disengage itself from the coacting clutch member, and, further, to the fact that the rollers 30 will tend to seek the centers of the notches 27 under any slight vibration that may be present in the mechanism. Since there is no element of centrifugal force in the servo action, there will be nothing to resist the disengagement of the synchronizer rings.

Another advantage of the invention is in the fact that the synchronizer ring 24 may be substantially the same in shape and size as synchronizer rings of standard accepted construction which have been designed for maximum compactness, and the addition of the servo mechanism makes no increase whatever in the total space required for the synchronizing mechanism.

The means for initiating engagement of the clutch facing comprises an annular spring 31 (see Fig. 3) mounted in an internal annular recess 32 in a radially outwardly thickened rim portion 33 of the synchronizer ring. The ring 31 has a plurality of radially outwardly extended portions 34 projecting through radial slots 35 in the rim portion 33. The portions 34 project just slightly beyond the periphery of the rim portion 33, into the path of the ends of the teeth 15 of the shiftable clutch member 11. The teeth 15 which register with the projected portion 34 of the springs 31, are cut away as at 36 for their full length, with the exception of narrow terminal regions 37 forming projections for engaging the projecting portions 34 of the springs 31.

In the operation of the device, assuming the parts to be in the neutral position shown in Figs. 1 and 5, and the operator desires to shift into high gear, or one-to-one ratio between the shafts 3 and 4, the gear shifting lever is manipulated so as to move the shifting fork 40 to the left, as viewed in Fig. 1, the fork 40 being received in a conventional collar 41 formed on the shiftable clutch element 11, whereby the latter is shifted to the left.

Referring now to Fig. 5, as the shiftable clutch element 11 moves to the left, as indicated in Fig. 6 by the arrow 42, the projecting terminal portion 37 of the teeth 15 will engage the projecting portions 34 of the springs 31, and since the portions 34 are confined in the radial slots 35 of the synchronizer rings 24, a certain amount of axial pressure in the direction of movement of the shiftable clutch element 11 will be imparted to the synchronizer ring 24 through the medium of the pring portions 34. The ring 31 is highly flexible so that as soon as the clutch faces 22 and 26 engage, the spring portions 34 will be depressed, as indicated in Fig. 6, and the terminal portion 37 of the teeth 15 will ride over them and pass them so that the spring portions 34 may return to their outer positions, accommodated in the cut-away regions 36 as indicated in Fig. 7.

Engagement of the clutch faces having thus been initiated, such engagement will be increased by the servo mechanism until synchronization has been effected, as hereinbefore described.

The shiftable clutch element may then be advanced into clutching engagement with the clutch teeth 13 or 14, as the case may be, and, the transmission of torque between the friction faces 22 and 26 having been eliminated, the wedging action between the rollers 30 and inclined faces 27, assisted by any slight vibration occurring in the mechanism, will cause the synchronizer ring to back off from the coacting friction clutch element 20.

Very little pressure is required to move the terminal portions 37 of the teeth 15 past the spring portions 34. The spring 31 need be only resistant enough to overcome what little friction may exist between the ring 24 and the rim of the torque-transmitting member 12, and need not carry the load of synchronization. Thus the initial stage of shifting operation requires practically no effort on the part of the operator. This is important for the reason that where a detent break-away mechanism having considerable resistance is employed, the teeth of the movable clutch element may be jammed unduly into the teeth of the cooperating clutch member before synchronization has been completed. By making it possible for the initial stage of shifting, i.e., up to engagement of the clutch teeth, to be performed with practically no effort, it is possible for the operator with much greater facility than formerly, to halt the shifting movement at the point of such initial engagement until synchronization has been completed, without jamming the teeth of the respective clutch members together.

Should the clutch faces 22 and 26 remain in engagement after synchronization has been effected, they will be separated when the shiftable clutch element 11 is shifted back toward neutral position, as indicated by the arrow 43 in Fig. 7. The terminal portions 37 of the teeth 15 will engage the projecting portions 34 of the springs 31, this time from the other side, and urge the synchronizer rings 24 away from clutching engagement with the friction face 22.

In Fig. 11 is shown a modified form of the resilient contact means, wherein three leaf springs 31a, are secured individually to the synchronizer ring 24, each having a radially outwardly arched portion 34a adapted to be engaged by the projections 37 of the teeth 15.

The annular form of ring 31 is preferred for the reason that it is securely retained against the effect of centrifugal force, and the portions 34 will not appreciably distend radially under varying centrifugal force, while at the same time the resistance to inward depression is relatively slight.

I claim:

1. In a transmission synchronizer, a rotatably mounted and axially fixed torque transmitting member, a relatively light shiftable clutch element having an axially movable and non-rotatable connection with said torque transmitting member and coaxial therewith, a member to be synchronized with said shiftable clutch element, having a friction clutch face, a synchronizer element coaxially mounted and axially adjustable with relation to said torque transmitting member, having a friction face for coaction with the aforesaid friction face, means interconnecting said synchronizer element and said torque transmitting member, adapted to increase clutching engagement between said friction faces under torque applied to said synchronizer element through such engagement, and means for initiating such engagement, comprising projections on said elements respectively, adapted to interengage with a light brushing contact during shifting movement of said shiftable clutch element.

2. In a transmission synchronizer, a rotatably mounted and axially fixed torque transmitting member, a relatively light annular clutch element encircling said torque transmitting member and having an axially movable and non-rotatable connection therewith, a member to be synchronized with said clutch element, having means for positive clutching engagement therewith and having a friction clutch face, a synchronizer element coaxially mounted and axially adjustable with relation to said torque transmitting member, having a friction face for coaction with the aforesaid friction face, servo mechanism interconnecting said synchronizer element and said torque transmitting member, adapted to increase clutching engagement between said friction clutch faces under torque applied to said synchronizer element through such engagement, and means for initiating such engagement, comprising a yielding member carried by one of said elements and adapted to engage the other of said elements as said positive clutch element is moved toward positive clutching position so as to transmit a light yielding axial push to said synchronizer element from said positive clutch element.

3. In a transmission synchronizer, a rotatably mounted and axially fixed torque transmitting member, a shiftable annular clutch element encircling said torque transmitting member and having an axially movable and non-rotatable connection therewith, a member to be synchronized with said shiftable clutch element, having a friction clutch face, a synchronizer element coaxially mounted and axially adjustable with relation to said torque transmitting member, having a friction face for coaction with the aforesaid friction face, servo mechanism adapted to increase clutching engagement between said friction faces under torque applied to said synchronizer element through such engagement and an annular spring having portions projected radially through said synchronizer element and adapted to be engaged by said shiftable clutch element during shifting movement of the latter, to initiate the engagement between said faces.

4. In a transmission synchronizer, a rotatably mounted and axially fixed torque transmitting member, a relatively light annular clutch element encircling said torque transmitting member and having an axially movable and non-rotatable connection therewith, a member to be synchronized with said clutch element, having means for positive clutching engagement therewith and having a friction clutch face, a synchronizer element coaxially mounted and axially adjustable with relation to said torque transmitting member, having a friction face for coaction with the aforesaid friction face, servo mechanism interconnecting said synchronizer element and said torque transmitting member, adapted to increase clutching engagement between said friction clutch faces under torque applied to said synchronizer element through such engagement, and a series of circumferentially spaced spring members carried by said synchronizer element and adapted to yieldingly engage portions of said shiftable clutch element during shifting movement of the latter, so as to initiate the engagement of said faces, said shiftable clutch element being cut away rearwardly of said portions so that said spring members may be disengaged as said shiftable clutch member moves on into positive clutching engagement with said member to be synchronized.

5. In a transmission synchronizer, a pair of coaxial rotative members to be synchronized, one of said members being shiftable axially, an axially movable synchronizer element having a friction clutch face adapted to engage a coacting friction face on the other of said members, and including an annular portion, and means for yieldingly transmitting axial movement from said shiftable member to said synchronizer element for causing said friction faces to become engaged, said means comprising an annnular spring having portions projected radially outwardly through said annular portion of the synchronizer element and adapted to be engaged by said shiftable member, and having portions intermediate said outwardly projected portions, engaged against inner face regions of said annular portion and thereby supported against radial distension under the effect of centrifugal force.

6. In a transmission synchronizer, a rotatably mounted and axially fixed torque-transmitting member, a shiftable clutch element having an axially movable and non-rotatable connection with said torque-transmitting member, a member to be synchronized with said shiftable clutch element, having a friction clutch facing, a synchronizer element coaxially mounted and axially adjustable with relation to said torque-transmitting member, having a friction clutch facing for coaction with the aforesaid friction clutch facing, means for initiating engagement between said friction facings, and servo mechanism for increasing such engagement, comprising V-shaped notched regions in said synchronizer ring, facing axially, and rollers engaged between said notched regions and said torque-transmitting member.

7. In a transmission synchronizer, a rotatably mounted and axially fixed torque-transmitting member including a radially projecting web portion and a rim portion at the periphery of said web portion, a shiftable annular clutch element encircling said rim portion and having an axially movable and non-rotatable connection therewith, a member to be synchronized with said shiftable clutch element, having a friction clutch facing, a synchronizer ring member bearing against the inner annular surface of said rim and axially slidable therein, said ring member having a friction facing for coaction with the aforesaid friction facing, means for initiating engagement between said friction facings, and rollers interposed between said synchronizer member and web portion of the torque-transmitting member on radial axes and engaging cam surfaces formed on one of said members, whereby to develop a servo action between said synchronizer member and said web portion for increasing said engagement between the friction facings.

8. In a transmission synchronizer, a rotatably mounted and axially fixed torque-transmitting member including a radially projecting web portion and a rim portion at the periphery of said web portion, a shiftable annular clutch element encircling said rim portion and having an axially movable and non-rotatable connection therewith, a member to be synchronized with said shiftable clutch element, having a friction clutch facing, a synchronizer ring bearing against the inner annular surface of said rim and axially slidable therein, said ring having a friction facing for coaction with the aforesaid friction facing, means for initiating engagement between said friction facings, axially opposed regions of said synchronizer ring and said web portion of the torque-transmitting member being formed so as to develop axial spreading pressure between said ring and web portion for increasing the engagement of said friction facings.

9. In a transmission synchronizer, a rotatably mounted and axially fixed torque-transmitting member including a radially projecting web portion and a rim portion at the periphery of said web portion, a shiftable annular clutch element encircling said rim portion and having an axially movable and non-rotatable connection therewith, a member to be synchronized with said shiftable clutch element, having a friction clutch facing, a synchronizer ring bearing against the inner annular surface of said rim and axially slidable therein, said ring having a friction facing for coaction with the aforesaid friction facing, means for initiating engagement between said friction facings, and means interposed between axially opposed regions of said ring and web portion for developing axial pressure therebetween under relative rotative movement thereof, whereby to produce a servo action for increasing the engagement of said friction facings.

10. In a transmission synchronizer, a pair of coaxial rotative members to be synchronized, one of said members being shiftable axially, an axially movable synchronizer element having a friction clutch face adapted to engage a coacting friction face on the other of said members, and means for yieldingly transmitting axial movement from said shiftable member to said synchronizer element for causing said friction faces to become engaged, said means comprising an annular spring having portions projecting radially outwardly from said annular portion and adapted to be engaged by said shiftable member, and having other portions secured in said annular portion and thereby supported against radial distension under the effect of centrifugal force.

11. In a transmission synchronizer, a pair of coaxial rotative members to be synchronized, one of said members being shiftable axially, an axially movable synchronizer element having a friction clutch face adapted to engage a coaxial friction face on the other of said members, and means for yieldingly transmitting axial movement from said shiftable member to said synchronizer element for causing said friction faces to become engaged, said means comprising a radially undulated annular spring having portions projecting radially outwardly from said annular portion of the synchronizer element and adapted to be engaged by said shiftable member, and having other portions circumferentially intermediate said projecting portions, secured in said annular portion against radial distension under the effect of centrifugal force.

SAMUEL O. WHITE.